(No Model.)
H. L. RICHARDSON.
COFFEE OR TEA POT.
No. 572,909. Patented Dec. 8, 1896.
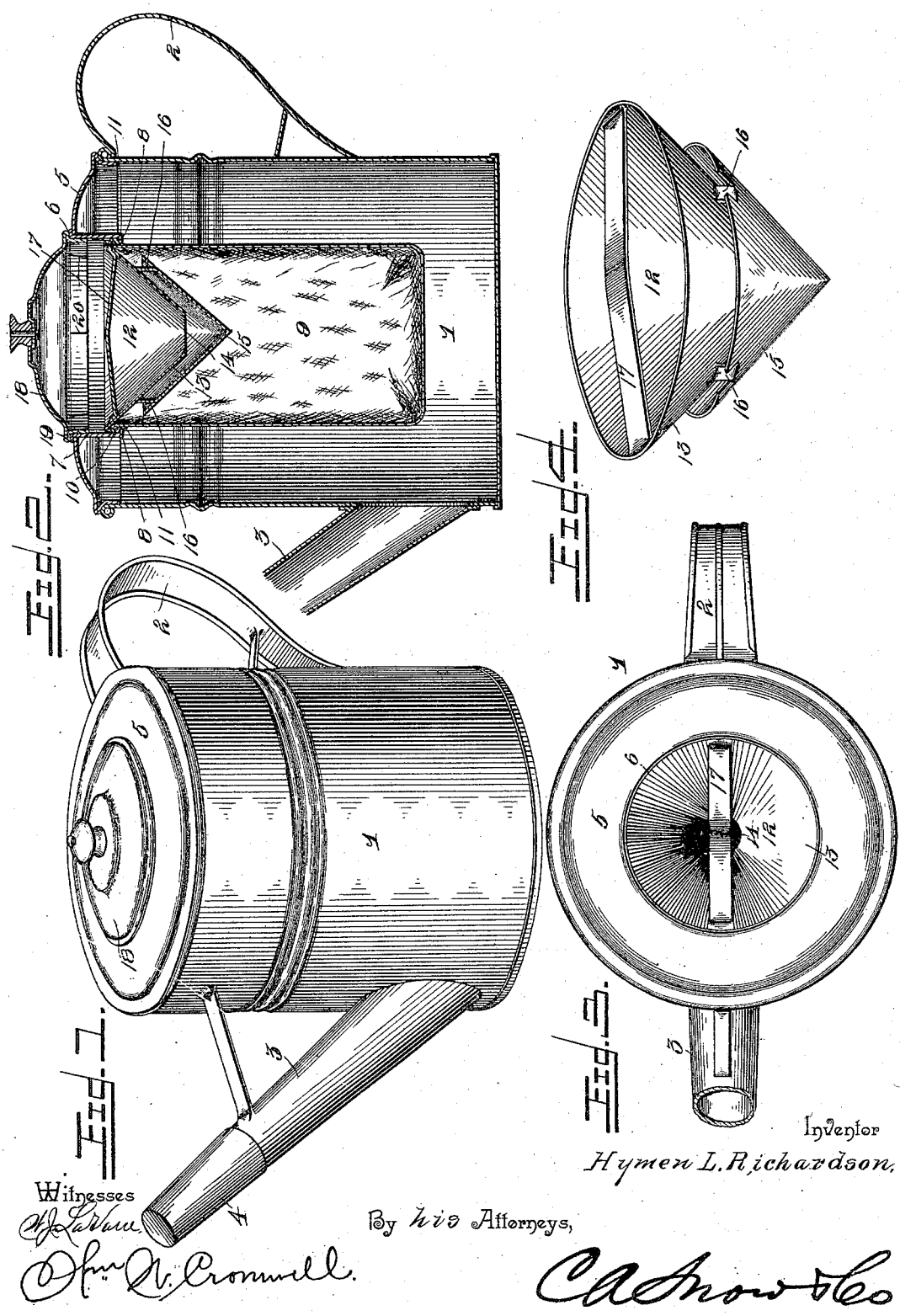
Witnesses
Inventor
Hymen L. Richardson,
By his Attorneys,

UNITED STATES PATENT OFFICE.

HYMEN LEANDER RICHARDSON, OF GAINESVILLE, GEORGIA.

COFFEE OR TEA POT.

SPECIFICATION forming part of Letters Patent No. 572,909, dated December 8, 1896.

Application filed June 30, 1896. Serial No. 597,611. (No model.)

*To all whom it may concern:*

Be it known that I, HYMEN LEANDER RICHARDSON, a citizen of the United States, residing at Gainesville, in the county of Hall and State of Georgia, have invented a new and useful Coffee or Tea Pot, of which the following is a specification.

This invention relates to new and useful improvements in coffee and tea pots.

The objects of the invention are to provide simple and efficient means for preventing escape of the flavor and strength of the coffee or tea during the process of making the beverage; to regulate the flow of the water into the pot, so that the same shall not be poured therein too quickly for properly extracting the strength of the coffee or tea, thereby retaining all the flavor and strength of the same and obtaining a greater quantity and superior quality of the beverage to the amount of coffee or tea used than by the ordinary method, and, further, to prevent escape of the impurities and thus produce a more healthful beverage.

With these and other objects in view the invention consists, substantially, in the construction, combination, and arrangement of parts as hereinafter fully illustrated, described, and claimed.

In the accompanying drawings, Figure 1 is a perspective view of a coffee and tea pot constructed in accordance with the present invention. Fig. 2 is a vertical transverse sectional view thereof. Fig. 3 is a top plan view with the cap of the lid removed. Fig. 4 is an enlarged detail perspective view of the trap for preventing escape from the pot of the flavor and strength of the contents thereof.

Similar numerals of reference indicate corresponding parts throughout the figures of the drawings.

Referring to the drawings, 1 designates a coffee or tea pot proper, which may be formed of any suitable material and is provided with the usual handle 2 and spout 3, a cap 4 being mounted on the end of the spout 3 and preventing the strength and flavor of the contents of the pot escaping therethrough. The pot 1 is also provided with a lid 5, which lid has at its center an enlarged opening 6, and projecting into the pot from the sides of said opening is a depending flange 7, having its inner edge bent at a right angle to the body portion thereof, so as to form a substantially horizontal support 8. Suspended from the support 8, within the pot 1, is a detachable bag 9, in which the coffee or tea is placed, and said bag is formed of a material suitable for the free passage of the water therethrough when such water is poured into the pot and over the coffee or tea within the bag 9. For holding said bag 9 upon the support 8 a split ring 10 is used, and the diameter of said ring is slightly greater than the diameter of the opening 6. The ring 10 is disposed in a pocket 11, formed at the upper end of the bag 9, which end is open, and when it is desired to suspend said bag from the support 8 said ring is contracted in order that the same may be passed through the opening 6 and placed upon the support 8. By reason of the ring 10 being split the tendency of the same when contracted is to expand, and it will therefore be seen that after being placed upon the support 8 the ring will press against the flange 7 and thus securely hold the bag 9 in its proper position.

Supported within the flange 7 is a trap 12, formed of any suitable material and designed to prevent escape of the flavor and strength of the coffee or tea within the bag 9. This trap consists of a funnel 13, having at its lower end an opening 14, and suspended from the lower side of the funnel 13 is a cup 15, preferably conical in shape and spaced a slight distance below said funnel. At suitable intervals around the upper edge of the cup 15 the latter is cut to form attaching-tabs 16, which tabs are bent out of alinement with the main portion of the cup 15 and are secured to the under side of the funnel 13, thereby suspending said cup spaced a slight distance therefrom. The funnel 13 is of such diameter at its top as will permit the same resting upon the split ring 10, but frictionally engaging the flange 7 within the opening 6, so as to bind the bag 9 to said flange 7. Thus it will be seen that as the boiling water is poured into the pot the same is first received by the funnel 13 and conducted thereby to the bag 9, in which the coffee or tea is placed. It will also be noted that the upper edge of the cup 15 is located above the opening 14 of the funnel 13, and when the water passes through said opening 14 it is necessary that the same flow upwardly and over the upper edge of the cup 15 before passing into the bag 9. By this construction the cup 15 at all times will contain a sufficient quantity of water to completely close the opening 14 of the funnel 13, thereby forming a hydraulic seal for the same and preventing escape therethrough of the flavor and strength of the coffee or tea in the bag 9.

The funnel 13 has at its upper edge a transverse handle-bar 17, by which the trap may be easily inserted into and removed from the opening 6, and for closing the latter a cap 18 is employed. The cap 18 has a flange 19, which is cut into sections 20, each section being capable of yielding and thus permitting the entire flange readily entering the opening 6.

The operation and advantages of the herein-described coffee and tea pot will be readily understood by those skilled in the art.

The desired quantity of coffee or tea having been placed in the bag 9, the trap 12 is inserted in the opening 6 and rests upon the ring 10, disposed within the upper end of the bag 9. After the lid 5 has been secured upon the pot 1 boiling water is poured into the latter through the funnel 13. The water passes through the opening 14 of the funnel 13 and upwardly and over the upper edge of the cup 15 into the bag 9 and over the coffee or tea therein, the beverage finally collecting in the pot 1 on the exterior of the bag 9.

By reason of the peculiar construction of the trap 12 it will be apparent that as the boiling water is poured therethrough the opening 14 of the funnel 13 is effectually closed, and after the flow of water has ceased the cup 15 will retain a sufficient quantity of the water to always cover said opening 14, thereby forming a hydraulic seal for the same and preventing escape of the flavor and strength of the coffee or tea. The trap 12 will also regulate the flow of the water into the bag 9, so that such water will not enter therein too quickly for properly extracting the strength of the contents thereof.

From the foregoing it will be seen that I have provided a coffee and tea pot wherein the flavor and strength of the coffee or tea is retained; that the flow of water into the pot is regulated and thus prevents the same entering too quickly for the proper treatment of the contents, whereby a greater quantity and superior quality of the beverage is obtained from the amount of coffee or tea used than by the ordinary method, and, finally, that the impurities are prevented escaping from the bag 9, thereby producing a more healthful beverage.

Having thus described the invention, what is claimed as new, and desired to be secured by Letters Patent, is—

1. A pot of the class described, comprising a pot proper, a lid therefor provided with an enlarged opening, a bag suspended within the pot from said opening and adapted to receive the material from which the beverage is made, a trap also supported in said enlarged opening and adapted to prevent escape from the pot of the flavor and strength of the contents thereof, said trap comprising a funnel and a cup suspended below and spaced from said funnel, the upper edge of said cup being cut at suitable intervals to form attaching-tabs adapted to be secured to the funnel to suspend the cup therefrom, said cup being also arranged in such relation to the opening of the funnel as to form a hydraulic seal therefor, and means for closing the opening in the lid of the pot, substantially as set forth.

2. A pot of the class described, comprising a pot proper, a lid therefor provided with an enlarged opening, a flange projecting into the pot from the sides of said opening and having its inner edge bent to form a substantially horizontal support, a bag suspended within the pot from said support and adapted to receive the material from which the beverage is made, a trap also mounted upon said support and adapted to prevent escape from the pot of the flavor and strength of the contents thereof, said trap comprising a funnel, a cup suspended below and spaced from said funnel, the upper edge of said cup being cut at suitable intervals to form attaching-tabs bent out of alinement with the main portion of the cup and adapted to be secured to the funnel to suspend the cup spaced a slight distance therefrom, said cup being also arranged in such relation to the opening of the funnel as to form a hydraulic seal therefor, and a transverse handle-bar secured to the funnel, and means for closing the opening in the lid of the pot, substantially as set forth.

3. A pot of the class described, comprising a pot proper, a lid therefor having an opening provided with a depending flange, and a cap for closing said opening, a detachable bag suspended from the flange within the pot and adapted to receive the material from which the beverage is made, and a trap supported detachably within said flange above said bag and having its upper edge frictionally engaging the flange so as to bind the bag thereto, said trap being adapted to prevent escape from the pot of the flavor and strength of the contents thereof, substantially as set forth.

In testimony that I claim the foregoing as my own I have hereto affixed my signature in the presence of two witnesses.

HYMEN LEANDER RICHARDSON.

Witnesses:
H. B. SMITH,
P. J. ROARK.